United States Patent [19]
Pomara, Jr.

[11] Patent Number: 5,263,407
[45] Date of Patent: Nov. 23, 1993

[54] APPARATUS FOR PREPARING A FOLDED FOOD PRODUCT

[76] Inventor: Johnny B. Pomara, Jr., 2656 Via La Paloma, Carrollton, Tex. 75006

[21] Appl. No.: 878,362

[22] Filed: May 4, 1992

[51] Int. Cl.$^5$ .............................. A21C 9/00; A23P 1/00
[52] U.S. Cl. ..................................... 99/450.6; 99/450.7
[58] Field of Search .............. 99/352, 353, 355, 450.1, 99/450.2, 450.4, 450.5, 450.6, 450.7; 426/501, 502, 516, 297, 373, 497, 512; 425/383, 363, 373, 110, 112, 130, 298; 53/215, 216, 209, 211, 115–118

[56] References Cited

U.S. PATENT DOCUMENTS

| | | | |
|---|---|---|---|
| 3,611,950 | 10/1971 | Battaglia | 99/450 |
| 3,633,517 | 1/1972 | Kao | 99/450 |
| 3,669,007 | 6/1972 | Pulici | 99/450 |
| 3,690,248 | 9/1972 | Schafer | 99/450 |
| 3,724,361 | 4/1973 | Schafer | 99/450 |
| 3,757,676 | 9/1973 | Pomara, Jr. | 99/450.6 |
| 3,782,271 | 1/1974 | Tobey et al. | 425/298 |
| 3,901,137 | 8/1975 | Jimenez | 99/353 |
| 3,946,656 | 3/1976 | Hai | 99/450 |
| 4,014,254 | 3/1977 | Ohkawa | 99/450 |
| 4,047,478 | 9/1977 | Trostmann et al. | 99/450 |
| 4,084,493 | 4/1978 | Quintana | 99/450 |
| 4,334,464 | 6/1982 | Shinriki | 99/450.2 |
| 4,388,059 | 6/1983 | Ma | 425/112 |
| 4,393,758 | 7/1983 | Anmahian | 99/450 |
| 4,439,124 | 3/1984 | Watanabe | 425/112 |
| 4,457,225 | 7/1984 | Bakker | 426/502 |
| 4,516,487 | 5/1985 | Madison et al. | 99/450.7 |
| 4,517,785 | 5/1985 | Masuda | 53/211 |
| 4,608,919 | 9/1086 | Prows et al. | 99/450.6 |
| 4,637,304 | 1/1987 | Suzuki | 425/383 |
| 4,638,729 | 1/1987 | Woodworth et al. | 99/450 |
| 4,691,627 | 9/1987 | Roberts | 99/450.2 |
| 4,913,043 | 4/1990 | Chueng | 99/450 |
| 4,953,455 | 9/1990 | Figueras et al. | 53/215 |

FOREIGN PATENT DOCUMENTS 9107883  6/1991  PCT Int'l Appl. ............... 99/450.7

*Primary Examiner*—Timothy F. Simone
*Attorney, Agent, or Firm*—Hubbard, Thurman, Tucker & Harris

[57] ABSTRACT

An apparatus for preparing a folded food product having an exterior food wrap folded about an inner filling in a two-stage operation. In the first stage, the food wrap is automatically filled and partially folded in one direction. The partially folded food product is transferred to a second stage having folding platforms which are advanced by a conveyor to one or more folding stations which activate a plurality of folding plates to make a series of folds in the other direction. The first stage is indexed by a reciprocating operator in combination with a one-way clutch and the two stages are integrated to operate synchronously so that a filled and partially folded product is deposited on each of a plurality of foldable support platforms on a continuously moving second stage container having the folding stations which actuate the subsequent folding operation.

12 Claims, 5 Drawing Sheets

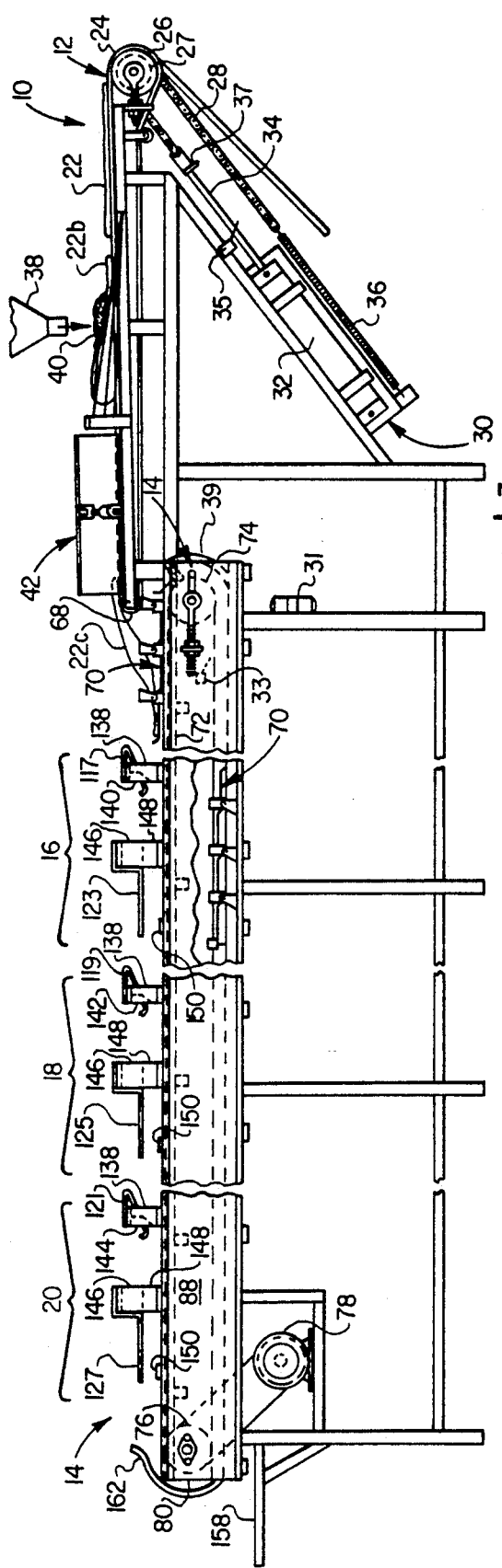
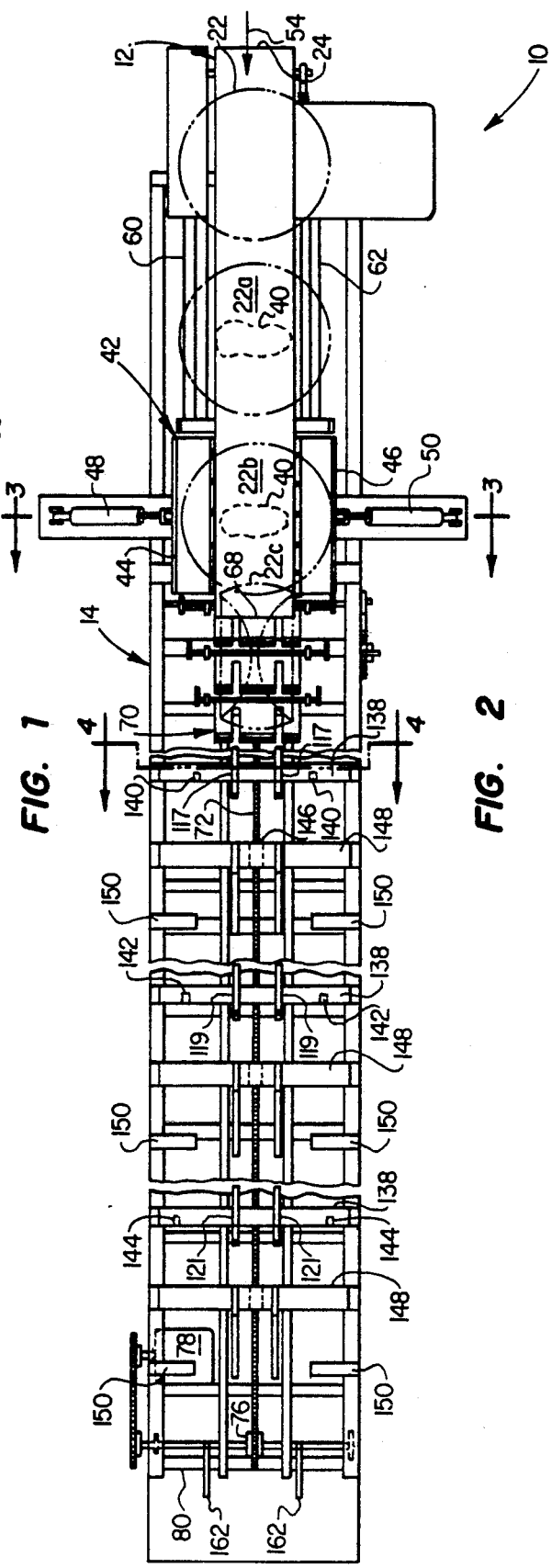
FIG. 1
FIG. 2

APPARATUS FOR PREPARING A FOLDED FOOD PRODUCT

FIELD OF THE INVENTION

This invention relates to an apparatus for automatically preparing a folded food product. More specifically the present invention concerns a continuously moving conveyor for folding a food product as it moves through a plurality of folding stations. Furthermore, the present invention includes a method of automatically preparing a folded food product having an exterior food wrap folded about an inner filling.

BACKGROUND OF THE INVENTION

In recent years, specialty food products particularly Mexican food products have become increasingly popular in the United States. Moreover, the increasing time demands upon families has caused an increase in the demand for heat and serve products. Particularly popular are frozen enchiladas, burritos, and other types of food products such as egg rolls that are offered for sale in the frozen food section of supermarkets. These foods are often sold individually or in packages containing several enchiladas or burritos. Typically the products need only be removed from the package, heated and served.

Historically, such products have been prepared manually by physically folding the tortillas or other dough sheets around a filling. This manual approach is time consuming and costly. In manually making a burrito or enchilada, a tortilla is folded longitudinally inward over the food filling from at least one edge. These longitudinal folds form the end folds of the folded food product, and such folds serve to prevent the filling from leaking after the food product is folded. After the longitudinal folds are made, the tortilla is folded in a direction perpendicular to the longitudinal folds. Such folding usually proceeds sequentially, folding a portion of the tortilla upon itself seriatim from one end of the tortilla to the other. Alternatively, the tortilla may be folded in half and then folded upon itself. Of course, other methods of folding may be utilized to provide a more compact food product or to allow for easier or more efficient manufacture.

As the demand for frozen food products such as burritos, enchiladas and others has increased there has developed a great need for a fast and fully automatic process for the continuous preparation of high quality folded food products. The novel apparatus and method of applicant's invention as described herein satisfies this demand for a fully automated procedure. With the applicant's invention, labor costs and personnel requirements are greatly reduced. Tortillas are placed upon the conveyor by a laborer, and the filling and folding of the food product is done automatically, without assistance from human operators. Further, because the applicant's process is continuous and completely automatic, operator handling of the food product and its ingredients is eliminated, thereby enabling superior operation sanitation and cleanliness over hand processes.

SUMMARY OF THE INVENTION

The present invention provides a novel apparatus for high volume, fully automatic preparation of a folded food product having an exterior food wrap folded about an inner filling. Further, the apparatus comprises a continuous conveyor means for transporting said food product through a plurality of folding stations, a plurality of support means on the conveyor for supporting and folding the food wrap, dispensing means for depositing a filling on individual food wraps which are transferred to each support means, and a plurality of folding plates on each support means for folding a food wrap over the filling at each of the plurality of stations along the conveyor.

More particularly, the present invention provides an apparatus as described which can automatically prepare at high speeds a variety of Mexican food products such as burritos and enchiladas, as well as other folded food products such as egg rolls.

Further, the present invention provides a method of automatically preparing a folded food product having an exterior food wrap folded about an inner filling. This method includes supporting such food wrap on a folding support on a moving conveyor, depositing a filler on said food wrap, automatically folding such food wrap longitudinally on either side of the filler and transversely folding the food wrap by successive folding steps each being initiated by actuating a bar on the folding support.

The present invention provides a unique and novel apparatus for automatically and precisely folding a dough sheet around a filler material so as to envelope the filler material within the dough sheet. The apparatus is advantageously constructed so that the filler material is deposited on the dough sheet, an indexed conveyor means having an indexing movement and conveyor belt for supporting and transporting a flat wrap food piece, provides longitudinal folding of a portion of the flat wrap food piece over the filler material on one or both sides. A filling dispenser having food stuff therein deposits a portion of food filler on each flat wrap piece as the conveyor belt is indexed to a position beneath the filling dispenser. After filling, the filled flat food wrapper is next indexed to a longitudinal folding station on the indexed conveyor where one or more longitudinal folds are made before transferring the partially folded food piece to a continuously moving folding conveyor.

A continuously moving folding conveyor means is in communication with the indexed conveyor means such that the folded food wrap is received by a plurality of folding support plates on the continuously moving conveyor means for receiving the folded wrap from the indexed conveyor means and for supporting the partially folded wrap as the conveyor means moves along. Further, the invention contemplates a plurality of foldable plates on the continuously moving folding conveyor comprising multiple folding sections for independently folding over a portion of the food wrap at designated folding stations along the continuous conveyor, with actuating means at each of the said stations along the continuous folding conveyor for actuating one of the folding sections of each folding food support to carry out said folding process and folding fingers to aid in the folding process. The folding sections include a fold down rail for uniformly completing the folds to maintain the correct shape of the folded product. Sets of hold down fingers keep the folded product in position.

The present invention also provides an indexing means for driving an endless conveyor belt at fixed indexed intervals comprising a one-way clutch or wheel bearing, a chain extending over said one-way clutch or wheel bearing, an air cylinder driving said chain in the first direction to index the sprocket on the one-way bearing in a forward position and returning in a second reverse direction to set the one-way element for another indexing movement. A spring affixed to the other end of the chain maintains tension on the chain at all times. A strong spring can be used in combination with a single action cylinder to draw the cylinder back to a starting position while slipping the one-way clutch.

The present invention results in a novel apparatus for the automatic, continuous processing of food products by a method which is highly reliable and efficient, yet inexpensive and relatively easy to maintain. Further, the apparatus of the present invention provides substantial labor saving efficiencies.

BRIEF DESCRIPTION OF THE DRAWINGS

FIG. 1 is a partially cutaway side elevation of the folding apparatus showing the indexing filling and folding conveyor and the continuous folding conveyor with a plurality of folding stations;

FIG. 2 is a partially cutaway plan view of the apparatus shown in FIG. 1 showing the initial filling and longitudinal folding operation;

DETAILED DESCRIPTION

Figure 3A:
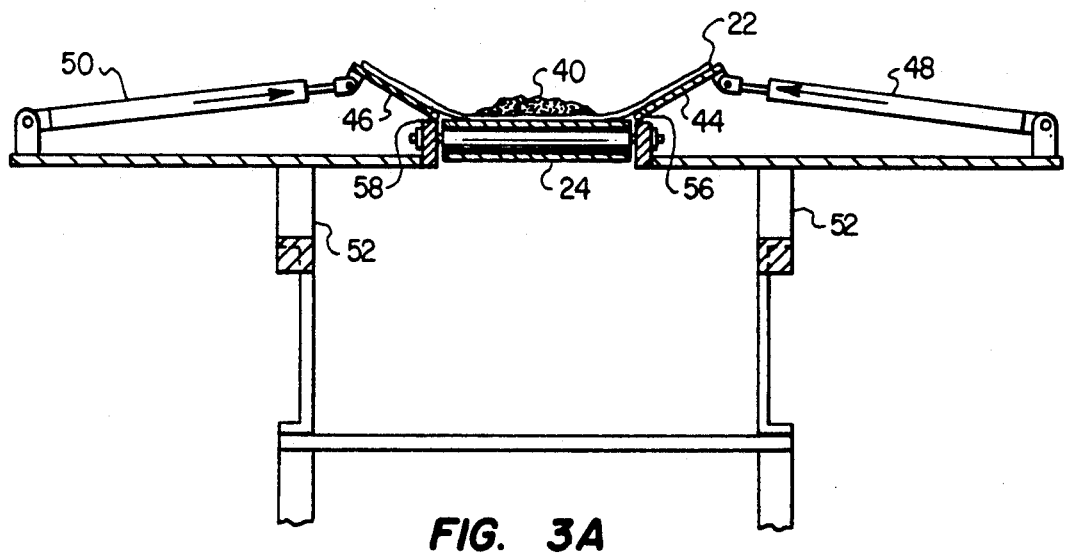
FIG. 3A is a cross-sectional end elevational view of the longitudinal folding apparatus on line 3—3 of FIG. 2 before folding.

In the description that follows, the drawings are somewhat schematic and not necessarily to scale. Like elements will be represented by the same reference numerals throughout. The preferred embodiment of the folding apparatus of the present invention is generally referred to by the reference numeral 10 in FIGS. 1 and 2. Folding apparatus 10 comprises several operatively associated subassemblies which cooperate in the automatic and continuous operation of forming a folded food product.

Folding apparatus 10 includes two main subassemblies, an indexing filling and folding conveyor 12, and a continuous folding conveyor 14 which receives the output from index conveyor 12. Indexing conveyor 12 receives the food product to be folded, fills it and performs one or more longitudinal folding operations whereupon the partially folded food product is transferred to continuous folding conveyor 14 having folding stations 16, 18 and 20. As seen in FIGS. 1 and 2, a tortilla or food wrap 22 is placed by a human operator or by suitable mechanical means onto the entry end of an indexed conveyor belt 24 of indexing conveyor 12. Conveyor belt 24 is suitably guided by rollers including an indexing roller 26 which has a one-way clutch portion wrapped by drive chain 28 of an operator means generally designated by the reference numeral 30.

Operator means 30 comprises reciprocable cylinder 32 having an operable piston operating rod 34 and tensionable spring 36, connected to opposite ends of drive chain 28 for operating a one-way clutch or ratchet device 27 which indexes roller 26. When rod 34 is retracted by cylinder 32, roller 26 is indexed by drive chain 28 to rotate a preselected amount which indexes conveyor belt 24 in the longitudinal direction a preselected distance toward the output end 68 of indexing conveyor 12. Cylinder 32 preferably comprises a double acting air cylinder which is suitable to extend and retract operating rod 34 connected to one end of chain 28. Spring 36, fixed at one end, is connected to the other end of chain 28 and maintains tension on the chain at all times to prevent slack from developing in the chain during rapid reciprocation. Spring 36 may be tensioned in this operation so that when the pressure on cylinder 32 is released, rod 34 is extended and spring 36 returns drive chain 28 to the position shown in FIG. 1 which resets the one-way clutch for another cycle. Each cycle advances conveyor 24 a preselected amount, the cycle being triggered by a suitably mounted switch operated by the folding platforms on continuous folding conveyor 14.

The indexed conveyor assembly functions to convey a tortilla 22 in steps from the point of placement at the entry end to a point 22*b* where it is centered under the output of a filling machine 38 mounted above. Filling machine 38 deposits a filling 40 upon the tortilla or other dough sheet. After such deposit, the tortilla or dough sheet is conveyed down conveyor 24 in a second cycle of operator means 30 to a point 22c exactly opposite longitudinal folder means 42 which is better seen in FIG. 2 and schematically in FIGS. 3A and 3B.

More particularly, filled tortilla 22a is indexed to a centered position 22b between and partially overlying opposed longitudinal folders 44, 46 which are foldingly mounted adjacent opposite sides of conveyor belt 24 and are connected to a pair of oppositely arranged operating cylinders 48, 50 which are pivotally mounted on suitable brackets supported by a frame 52 which supports indexing conveyor 12. These folders function to fold the tortilla in a longitudinal manner, preferably along both edges of the tortilla. The longitudinal direction is indicated by the arrow 54 in FIG. 2 which also defines the longitudinal central axis of apparatus 10.

Figure 3B:
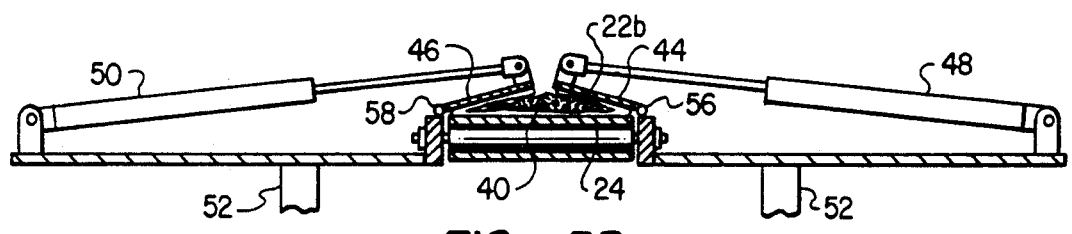
FIG. 3B is a cross-sectional end elevational view of the longitudinal folding apparatus on line 3—3 of FIG. 2 after folding.
Figure 7A:
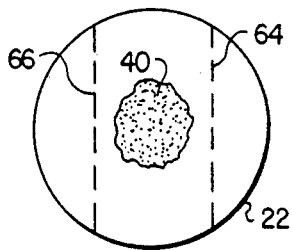
FIG. 7A is a plan view of an exterior food wrap on which a filling has been deposited, showing the longitudinal fold lines.

Referring now to FIGS. 3A and 3B, the operation of longitudinal folder means 42 is revealed. FIG. 3A shows that cylinders 48, 50 have their outer ends suitably hinged to brackets mounted on frame 52. This fixes one end of the cylinders. The cylinder rods are suitably hinged to the underside of longitudinal folder plates 44, 46 which are mounted by hinges 56, 58 closely adjacent the outer side edges of conveyor belt 24. In the unextended position of cylinders 48, 50, folders 44, 46 lie approximately flat. Guides 60, 62 are employed to gently raise the opposite outer edges of tortilla 22a as it is indexed to position 22b so that it doesn't hang up on folders 44, 46. The weight of filler 40 helps in this regard by holding down the center of the food wrap on belt 24. When the rods of cylinders 48, 50 are extended under influence of air pressure, longitudinal folders 44, 46 rise up and fold over to the position of FIG. 3B and thereby successive tortilla food wraps 22 are folded along opposed longitudinal fold lines 64, 66 shown in FIG. 7A.

Upon retraction of cylinders 48, 50 the folded tortilla designated 22c is ready for the next indexing cycle of operator means 30 which causes it to cascade over the output end 68 of indexing conveyor 12 synchronously with the arrival under output end 68 of one of a plurality of foldable support platforms 70 which are carried by continuous folding conveyor 14. A plurality of spaced apart support platforms 70 are connected to continuous chain 72 on continuous folding conveyor 14 which passes around an idler sprocket 74 at one end of conveyor 14 and drive sprocket 76 driven by motor 78 at the opposite output end 80 of conveyor 14. Conveyor chain 72 operates in a circular manner moving support platforms toward output end 80 of conveyor 14 and returning them on the underside back towards indexing conveyor 12 in a continuous process. One of the returning support platforms 70 is seen in the cutaway portion of FIG. 1 and they are spaced apart sufficiently to allow for cycling of indexing conveyor 12.

The operation of continuous conveyor 14 and indexing conveyor 12 is preferably integrated by means of a suitably positioned triggering switch 33. Triggering switch 33 is sequentially activated by the arrival of each of the support platforms 70 which are timed to cam triggering switch 33 to cycle operator means 30 just as each support platform 70 arrives under end 68 of conveyor 12 to receive a partially folded product 22c and then carry it longitudinally along the upper portion of conveyor 14.

Preferably, the system is integrated by pneumatically operated switches, valves and cylinders although it is possible to utilize combinations of electrically and mechanically or pneumatically operated devices to perform the sequential functions. A combination of a double piloted four way air valve 31, triggering switches 33 and 35, stop 37 and air cylinders 32, 48 and 50 constitute a conventional control system which integrates the individual functions. The filling step may be triggered along with cylinders 40 and 50 or it may be triggered by a conventional electric eye (not shown) which detects the presence of an indexed tortilla and operates filler 38 in response to the indicated presence of a food wrap tortilla. This method has the decided advantage that if somehow the tortilla didn't arrive in filling position, filling is not deposited on the machine parts. Inattention by an operator or hang ups could temporarily stop the flow of food wraps while the machine was otherwise operating properly at a rapid speed.

Triggering switch 33 on conveyor 14 is triggered each time a spaced apart support platform 70 moves past it and it is connected to air valve 31. Air valve 31 is also connected to cylinder 32 and triggering switch 35 and for purposes of illustration will be assumed to be connected to cylinders 48 and 50. When switch 33 is triggered, it causes valve 31 to cycle cylinder 32 by retracting operating rod 34 to cause indexing conveyor 12 to index one indexing step. This results in moving conveyor belt 24 to move a new food wrap 22 directly under filler 38 and a previously filled food wrap 22a directly between folders 44, 46 in position 22b while at the same time depositing a longitudinally folded filled food wrap 22c on a support platform 70 as it passes under end 68 of indexing conveyor 12.

Just as the indexing of conveyor 12 is complete, a stop 37 on the end portion of operating rod 34 triggers switch 35 mounted with cylinder 32. Triggering switch 35, simultaneously in cooperation with four way air valve 31, causes folding cylinders 48, 50 to extend to form the longitudinal folding of food wrap 22b and reverses double acting cylinder 32 which again extends operating rod 34 to the position shown in FIG. 1. The one way clutch 27 allows this to occur without changing the position of indexing conveyor belt 24. While cylinder 32 is retracting, cylinders 48, 50 complete the folding operation and cycle to the flat or nearly flat position shown in FIG. 3A ready for the next cycle. Cylinders 48, 50 may have a release valve or limit switch that relieves the operating pressure after they have extended a predetermined amount and an internal return spring or they may be double acting under control of the air valve. It can be seen that the cycling of indexing conveyor 12 is thus integrated with the speed of continuous folding conveyor 14 which is preferably adjustably variable to obtain the best folding and production condition with any variation in raw materials.

Figure 8:
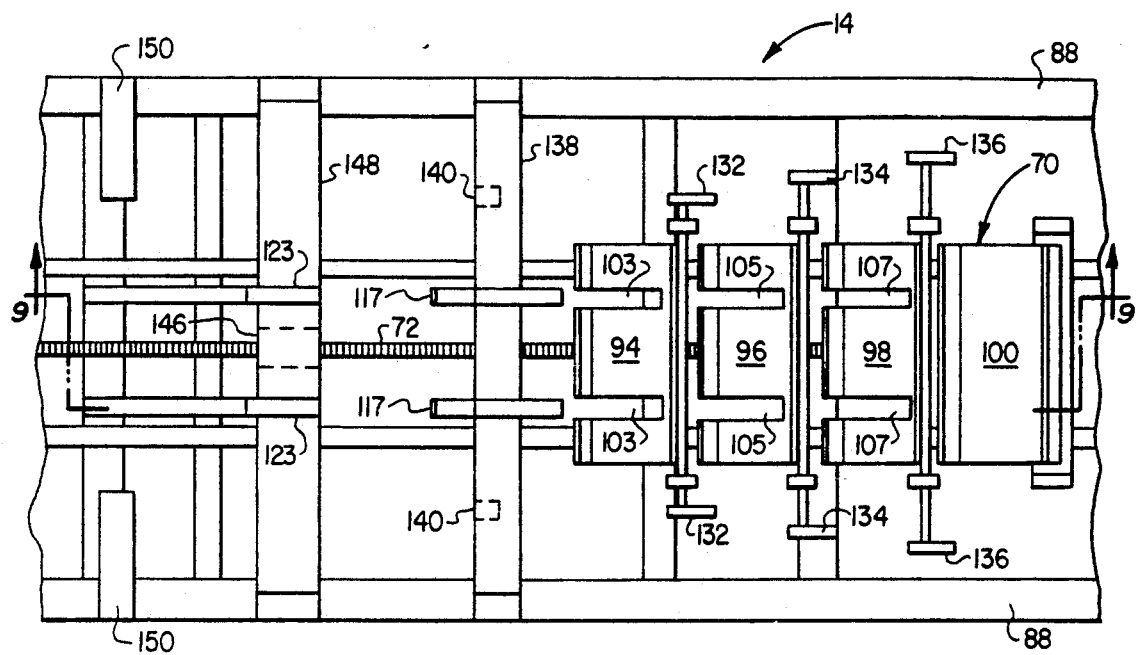
FIG. 8 is a cutaway plan view of a portion of the continuous folding conveyor showing a typical support platform moving towards spaced apart first and second actuating means which operate the folding plates.

Every time a new platform 70 comes into position for loading, indexing of filling and folding conveyor 12 is initiated. The longitudinally folded product 22c being loaded on a support platform 70 in FIG. 1 is then moved longitudinally towards folding stations 16, 18 and 20. An enlarged view of a typical support platform 70 is seen in FIGS. 5 and 8.

Figure 5:
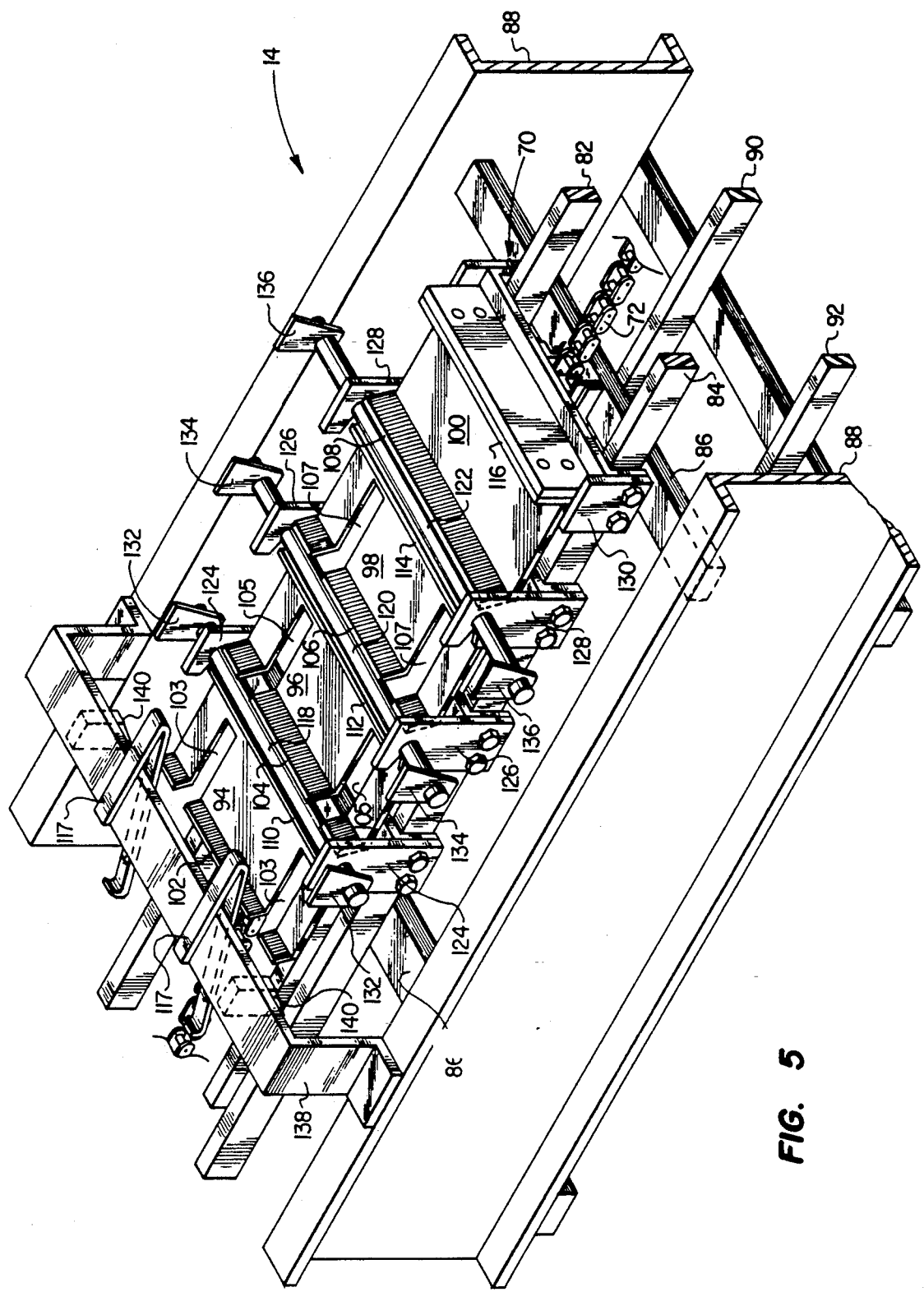
FIG. 5 is a perspective view of a typical support platform in a position for travel to a folding station.

Referring now to FIG. 5, a section of continuous conveyor 14 as shown is seen connected to chain 72 and straddling a set of opposed longitudinal bars 82, 84 spaced apart on either side of chain 72. The bars are held in frame 88 by cross members 86 below the chain.

Cross members 86 connect side frame members 88 of continuous conveyor 14. Another set of longitudinal bars 90, 92 are seen identically spaced below bars 82, 84 in such a manner as to support the returning support platforms 70 in a controlled manner as they traverse on the bottom chain moving inbound in the direction of indexing conveyor 12. Support platforms 70 move in a controlled pattern as they slide along supported by bars 82, 84 in one direction, and by bars 90, 92 in the opposite direction. The longitudinal bars are suitably made of a hard plastic material which allows the platforms to slide without excessive force or chattering.

Support platform 70 comprises a first folding plate 94, a second folding plate 96, a third folding plate 98, and a holding plate 100. These plates are generally rectangular in shape having respective transverse free ends 102, 104, 106. Holding plate 100 may have a similar end 108, but it is not free since plate 100 is designed to receive the final folded product and does not itself fold.

Respective first, second and third folding plates 94, 96, 98 have respective opposite transverse edge portions 110, 112, 114 which are respectively welded to rotatable bars 118, 120, 122 and are journaled for rotation in respective opposed spaced apart brackets 124, 126, 128. Holding plate 100 is fixed in bracket 130 and does not fold. The folding plates are approximately equal to each other in width. They are adapted for advantageously folding upon the next adjacent folding plate to provide transverse folds to the longitudinally folded tortilla 22c. Plates 94, 96, 98 have respective pairs of spaced apart slots 103, 105 and 107.

First folding plate 94 is equipped with a pair of upstanding folding levers 132 fixed to bar 118. Second folding plate 96 is equipped with a pair of upstanding folding levers 134 connected to bar 120. Third folding plate 98 is equipped with a pair of upstanding folding levers 136 connected to bar 122, but because bar 134 is longer than bar 132, and bar 136 is longer than bar 134, the pairs of upstanding folding levers are not laterally aligned. This makes it possible to selectively operate the folding levers by pairs of spaces apart camming levers 140, 142, 144 mounted on brackets 138 attached to side frame members 88. It may be seen that with chain 72 moving longitudinally to the left in FIG. 5, folding levers 132 will simultaneously engage a spaced apart set of camming members 140 mounted on bracket 138 above the plane of travel, but since folding levers 134 and 136 are spaced farther apart, they would not encounter camming members 140.

Camming members 140 form an actuating means which lift and rotate first folding plate 94 in a clockwise direction about the transverse axis defined by bar 118. FIG. 1 shows the orientation of bracket 138 having camming members 140 in first folding station 16. In a similar fashion, camming members 142 are mounted in a bracket 138 of second folding station 18 and camming members 144 are mounted in a bracket 138 of third folding station 20. Camming members 142 serve as an actuating means for folding levers 134 to lift and rotate folding plate 96 and camming members 144 serve as an actuating means for folding levers 136 which lift and rotate third folding plate 98.

Figure 9:
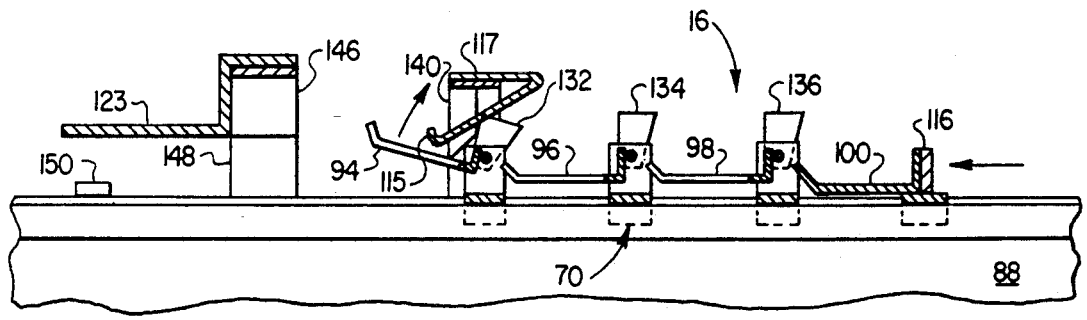
FIG. 9 is a side elevation section on line 9—9 of FIG. 8 after the typical support platform has encountered the first actuating means, showing a section through a folding finger which cooperates with the folding plate to produce a reproducible tight fold.
Figure 10:
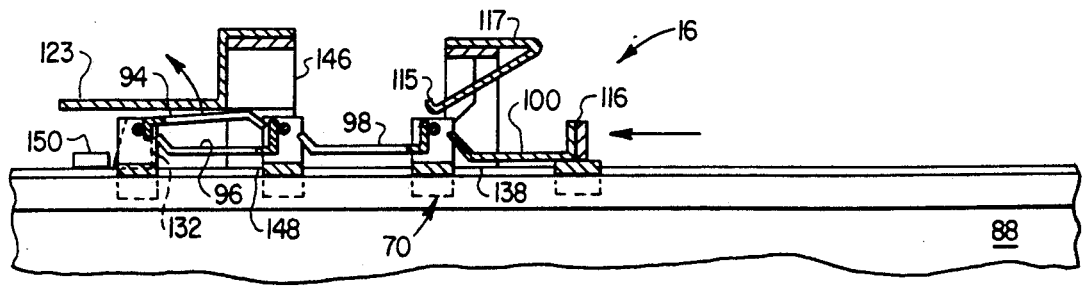
FIG. 10 is a side elevation section of FIG. 8 after the typical support platform has moved still further in the direction of travel to encounter the second actuating means just ready to unfold the first plate, showing a section through a hold down finger which cooperates with the folding plate to hold the folded product on the platform during unfolding of the plate.

FIG. 5 shows a pair of folding fingers 117 mounted by welding or fastening to bracket 138, which are preferably somewhat springy steel angled forwardly with respect to the direction of travel. The folding fingers do not interfere with movement of the support platforms under them. Folding fingers 117 cooperate with folding plate 94 to aid in establishing a transverse fold line in the product being folded and in addition tend to tighten up the folds in the folded product and make them more uniform. FIGS. 8, 9 and 10 show how they are positioned and how they look from the side. By reference to FIGS. 1 and 2, it is seen that each bracket 138 has a similar set of fingers 117, 119, 121 which operate the same way as fingers 117 on each of the respective plates 94, 96, 98.

It should be noted that fingers 117, 119, 121 do not have to be located over slots 103, 105, 107, because they are adapted to brush over the product lying on the foldable plates as they move forward on the conveyor and do not actually contact or interfere with pivoting of the folding plates.

Folding stations 16, 18 and 20 also have a fold down rail 146 mounted in brackets 148 centered above the conveyor chain as seen in FIGS. 1 and 2. These serve to assure completeness and uniformity of each fold in turn. Finally, each folding station 16, 18 and 20 has a second set of camming members 150 extending inwardly from the sides of conveyor 14 a distance which will trip any of camming members 140, 142, 144 which have been rotated so as to extend downwardly below a horizontal position.

Figure 4:
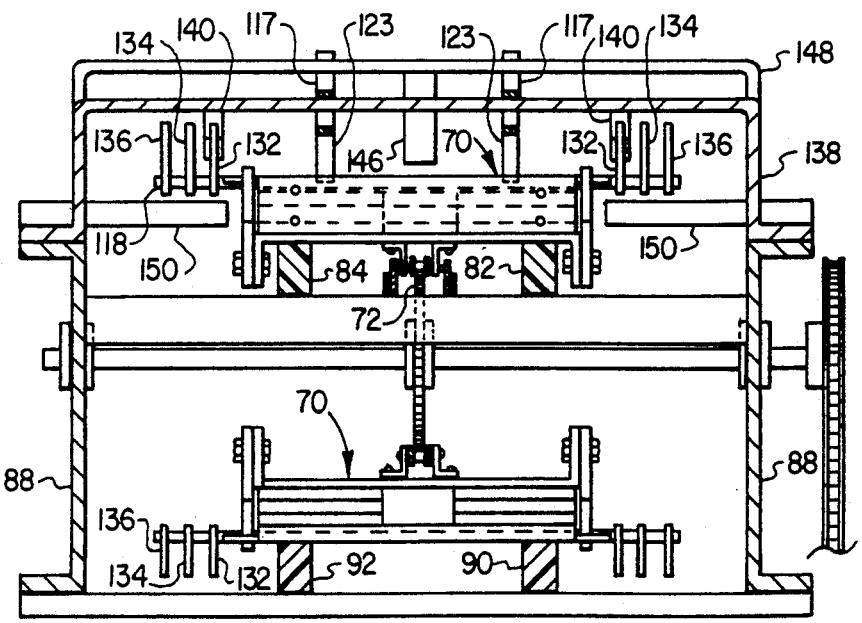
FIG. 4 is a cross-sectional end elevational view of folding stations on line 4—4 of FIG. 2 showing an outbound support platform ready to perform a first transverse fold and an inverted support platform returning on the continuous folding conveyor to the indexing conveyor.

An end view of the arrangement is seen in FIG. 4 which shows a typical support platform 70 above conveyor chain 72 sliding along bars 82, 84 of continuous conveyor 14 toward first folding station 16, and another typical support platform 70 hanging below the conveyor chain slidingly supported by bars 90, 92, returning toward indexing conveyor 12.

FIGS. 8-10 show one set of folding fingers 117 in relation to a typical support platform 70 moving along continuous conveyor 14. It also shows one set of spaced apart hold down fingers 123 which are mounted on bracket 148. FIGS. 1 and 2 show that each bracket 148 has an identical set of hold down fingers which are numbered sequentially 123, 125, 127. Hold down fingers 123, 125, 127 do cooperate with respective slots 103, 105, 107, because they have end portions which extend horizontally over respective folding plates 94, 96, 98 during a time sequence when the plates are being pivoted back to an unfolded condition. The hold down plates are located just above the folded food product and keep it from sticking to or otherwise following the folding plates as they are unfolded back to a flat position.

In FIG. 9 the typical support platform from FIG. 8 having moved forward, is seen in side view without the tortilla or other food product that would be lying on the folding plates 94, 96, 98, 100. It can be visualized from this how the curved end 115 of folding finger 117 brushes over the upper portion of the food product as support platform 70 moves forward while first folding plate 94 pivots around and over next folding plate 96. This action tends to tighten the folds and the presence of curved end 115 is positioned to encourage the fold to take place along transverse fold line 152 in a reproducible and repeatable manner so as to create greater uniformity in the folded product. Folding fingers 119 and 121 perform the same function for second fold 154 and the third fold 156 at folding stations 18 and 20.

In FIG. 10, typical folding platform has advanced from the position of FIG. 8. Folded over first folding plate 94 is just ready to emerge from under fold down rail 146 and its actuating lever 132 is about to encounter camming members 150 which will unfold it up around hold down fingers 123 without interference because of the cooperating slots in the fold down plates. Hold down fingers keep the food product which has been folded and deposited on the next fold down plate from following the unfolding plate.

Figure 6A:
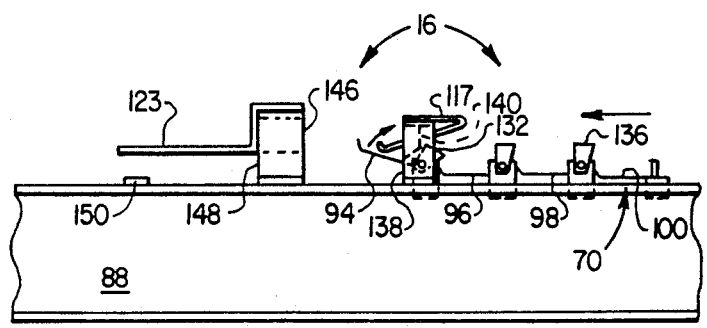
FIG. 6A is a schematic side elevational view of a folding station showing how a first transverse folding operation is initiated by a fold plate.

Operation of the folding mechanism will now be described with reference to FIGS. 6A-D. A longitudinally folded food product 22c is lying across folding plates 94, 96, 96, and plate 100. It has been omitted from FIGS. 6A-D in the interest of clarity. FIG. 6A shows a support platform 70 of FIG. 5 which has now moved forward in the direction of the arrow such that folding levers 132 have encountered camming members 140 and are rotating first folding plate 94 in the direction of the arrow as it passes under bracket 138. The angled ends of folding fingers 117 brush over the food product which is lying on folding plate 94 as it moves forward and pivots upwardly, to help form a crease at the proper place on the end portion of the food product which is being folded over. This creates first fold line 152 in FIGS. 7B-C at approximately the axis of rotation 118 of first folding plate 94. Further movement of platform 70 continues the first fold as plate 94 continues to be rotated upwardly and over above next folding plate 96.

Figure 6B:
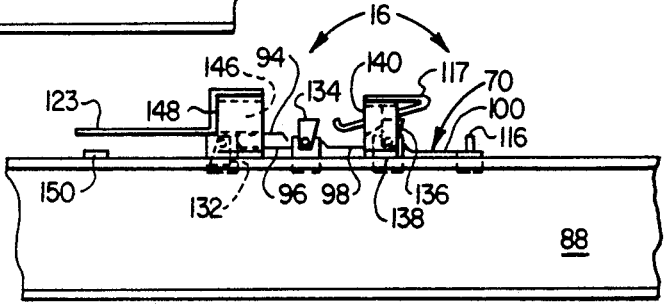
FIG. 6B is a schematic side elevational view of the first transverse fold plate of FIG. 6A passing under a first fold down rail which completes a first transverse fold.
Figure 7B:
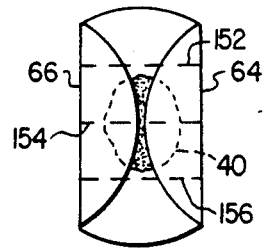
FIG. 7B is a plan view of the food product of FIG. 7A after the longitudinal folds have been completed, showing the transverse fold lines.
Figures 7C, 7D:
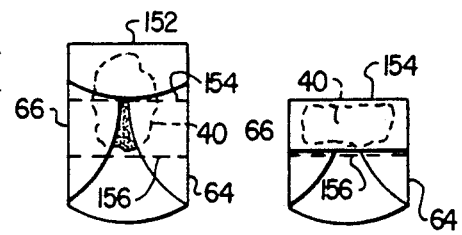
FIG. 7C shows the product of FIG. 7B after a first transverse fold has been made.
FIG. 7D shows the product of FIG. 7C after a second transverse fold has been made.

In FIG. 6B, the underside of now folded first folding plate 94 is seen sliding under fold down rail 146 as support platform 70 continues to move forward. This provides a positive conclusion to the first folding operation which is completed when plate 94 exits from under fold down rail 146. As platform 70 moves forward, camming members 140 do not engage folding levers 138 of third folding plate 98 in FIG. 6B because of a lateral space between them.

Figure 6C:
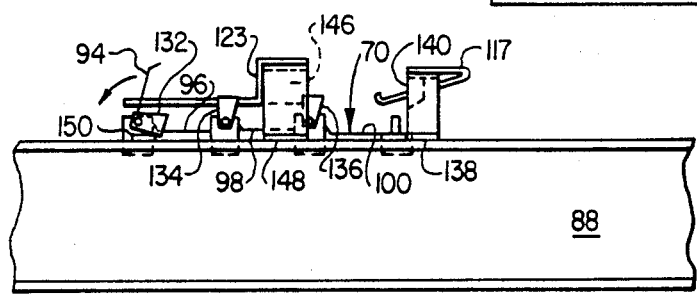
FIG. 6C is a schematic side elevational view of the folding platform of FIGS. 6A-B showing an actuating means returning the first fold plate an original flat position.

FIG. 6C shows the next phase in the operation wherein previously rotated plate 94 is being kicked back to its original flat-lying position by camming contact between camming members 150 and folding levers 132 as unit 70 continues to move toward the second and third folding stations. As folding plate 94 is being unfolded in the direction of the arrow by camming members 150, there is no interference with hold down fingers 123 because of slots 103 in fold down plate 94 which are aligned with the hold down fingers. Hold down fingers 123 hold the previously folded over food product in place on second folding plate 96 by preventing any tendency for the damp food product from sticking to unfolding fold down plate 94.

Figure 6D:
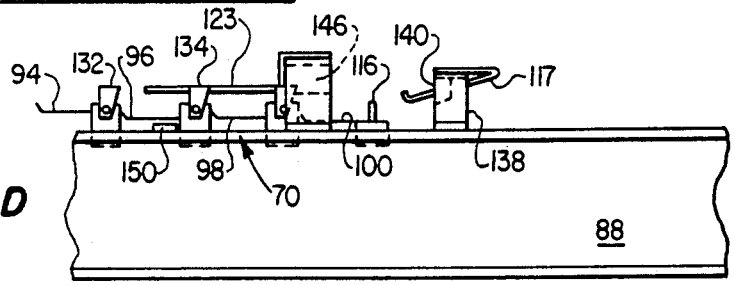
FIG. 6D is a schematic side elevational view of the folding station of FIGS. 6A-C after the folding support platform has returned to a flat condition and is moving longitudinally toward a second folding station.

FIG. 6D shows the support platform after the first transverse folding operation has been completed. The first folded product, folded along transverse fold line 152, is now lying upon folding plate 96 in a folded over condition with the unfolded remainder on folding plates 98 and 100. What is now on folding plate 96 will be folded over to lie upon the next folding plate 98 in second folding station 18.

At second folding station 18, the process is repeated except that this time second folding plate 96 is folded over around bar 120 as a rotational axis, to form second transverse fold line 154. In this case, folding levers 134 are activated by identical but laterally offset camming members 142 so that the double folded product which was lying on second fold plate 96 is now folded over again to lie on third folding plate 98. The fold is completed by passing the underside of second folding plate 96 in contact with another fold down rail 146 of second station 18 to complete the fold. Folding plate 96 is returned to its flat-lying condition of FIG. 6D upon activation of folding levers 134 by camming members 150.

The folding fingers and hold down fingers function exactly as before.

Figure 7E:
FIG. 7E is a plan view of the finished folded food product showing the filling in dotted outline.

The unit 70 then proceeds to the third and final folding station 20 except that this time third folding plate 98 is folded over onto holding plate 100 to complete the third transverse fold 156 and deposit the final folded product in the holding area on plate 100. In this case, activation of folding levers 136 and compression caused by another fold down rail 146 completes the fold and makes the product shape uniform. As these operations are being performed, additional longitudinally folded products 22c are being deposited upon other support platforms 70 and moved along to pass through the folding stations. The completed folded product from support platform 70 which is folded and resting on holding plate 100 is discharged off the outboard end 80 of conveyor 14 when chain 72 turns around end sprocket 76. The product may fall onto a collection surface 158 or any suitable conveyor or collecting mechanism. The final folded product is shown in FIG. 7E.

As each of the support platforms 70 move to the output end 80 and are rotated around to be carried by conveyor chain 72 back toward indexing platform 12 for reloading, they are supported and kept from flopping by a pair of curved rails 162. Rails 162 ensure that they run smoothly into contact with lower longitudinal bars 90, 92, which keeps them in a controlled position as they travel. Similarly, at the input end of conveyor 14, another pair of curved rails 39 spaced from idler sprocket 74 insure that support platforms 70 turn smoothly as chain 72 passes around sprocket 74 and keep foldable plates 94, 96 and 98 from flopping open.

In the best mode, it is contemplated that the operator means for the indexing conveyor may comprise dual operator means 30 on either side of the conveyor belt 24, connected through a pair of one-way clutches on opposite ends of indexing roller 26. Dual cylinders 32 may be employed to operate alternately in order to index the conveyor for rapid intermittent action. When one of the cylinders is extended as in FIG. 1, the other would be retracted. A signal from the triggering switch through the four-way valve would first retract the extended cylinder and at the same time extend the retracted cylinder and alternate between the cylinders so that when one of the cylinders is being retracted to index the conveyor, the cylinder on the opposite side would be extending. In this way, more rapid cycling of the indexing conveyor 12 can be achieved because the indexing conveyor can be indexed approximately twice as rapidly as would be the case if only one cylinder were employed. Alternately still, the indexing conveyor might be operated electrically by means of a stepper motor which is triggered by a switch on conveyor 14.

The first, second and third folding plates are preferably progressively deeper to accommodate the extra thickness of the partially folded product which naturally occurs as it is folded over on itself during the sequential folding operations.

It may also be desirable to employ one or more fine misting sprays of water on the flat food product before folding or at one or more of the stations on conveyor 14 in order to assure that the food material is softened for folding and which tends to increase the tackiness between the layers when the product is folded over so that it tends to remain in the folded shape. A non-stick coating may be applied to the plates which touch the product in order to minimize any undesirable tendency to stick.

Certain other objects and advantages of the invention will be apparent to those skilled in the art in view of the detailed description of the presently preferred embodiment of the invention taken in connection with the accompanying drawings. For instance, other folding schemes could be employed. Although the preferred embodiment uses folds of twenty-five percent upon each other, in a contiguous manner from one end of the tortilla to the other, it is anticipated and believed that the food wrap 22 proceeding along the conveyor could be folded in a manner whereby the tortilla is folded over upon itself to its middle, or a fifty percent fold, and then doubled upon itself in a final fold. This alternate method of lateral folding of the longitudinally folded tortilla 40 could provide another way of folding the food product, and is within the scope of the present invention. Other folding schemes could be employed pursuant to the present invention.

I claim:

1. A folding platform for forming a folded food product by making multiple folds of a flat wrap over a filler, comprising:
   a. a plurality of independently folding sections having a flat support position, each adapted to sequentially fold over on another adjacent folding section of the platform;
   b. folding levers carried by each folding section, adapted for making contact with camming means to sequentially fold each section over on another section,
   c. first camming means for sequentially contacting the folding levers to fold each folding section in turn, and
   d. second camming means adapted to return any folded folding section to its flat support position after each fold is made.

2. The folding platform of claim 1 wherein:
   the plurality of folding levers are laterally spaced to cooperate with longitudinally spaced cams of said first camming means to sequentially fold the folding sections, said second camming means comprising longitudinally spaced cams positioned to alternate with the longitudinally spaced cams of the first camming means so that folding and unfolding of a folding section is performed before another folding section can be folded.

3. The folding platform of claim 1 wherein:
   said folding sections comprise adjacent rectangular shaped folding plates independently foldable about a folding axis to fold over the next adjacent plate.

4. The folding platform of claim 3 wherein:
   said folding plates are each fixedly connected at one transverse side to a rod member which comprises said folding axis, said rod being journaled for rotation during the folding of said plates, said folding levers being fixed to said rod members between a first position corresponding to the flat support position and a second position corresponding to a folded position of a folding plate over the next adjacent plate.

5. A folding platform for use on a conveyor which moves the platform along a line wherein the folding platform receives and makes multiple folds on a flat wrap over a filler, comprising;
   a folding platform attachable to a conveyor line for receiving, carrying and folding a flat wrap over a filler, the folding platform comprising,
      a plurality of closely successive independently foldable plate members arranged in a line comprising at least first and second foldable plate members and a holding member following the last foldable plate member,
      a first foldable plate being rotably mounted to fold over the second foldable plate, being capable of folding and transferring a flat wrap and filler to the second foldable plate and unfolding,
      a second foldable plate being rotably mounted to fold over the holding member, being capable of folding and transferring the flat wrap and filler to the holding member and unfolding,
      actuation means for operating the foldable plates in succession, one at a time;
   wherein a flat wrap deposited on the first foldable plate is successively folded and transferred to the next foldable plate and finally to the holding member.

6. The folding platform of claim 5 wherein the folding platform comprises first, second and third successive foldable plates, wherein the second foldable plate is rotably mounted to fold over the third foldable plate, being capable of folding and transferring the flat wrap and filler to the third foldable plate and unfolding and the third foldable plate is rotably mounted to fold over the holding member and unfolding, to fold and transfer the folded flat wrap and filler to the holding member.

7. The folding platform of claim 5 wherein the plurality of foldable plate members are adapted for individual attachment to an endless conveyor of the type having rollers or sprockets at the ends for changing direction, so that the foldable plates turn easily with the conveyor.

8. The folding platform of claim 5 wherein the foldable plate members have one or more longitudinally extending slots which permit fingers on a conveyor line to contact the folded product through the slots, to improve folding without interfering with folding movement of the foldable plates.

9. The folding platform of claim 6 wherein the plurality of foldable plate members are adapted for individual attachment to an endless conveyor of the type having rollers or sprockets at the ends for changing direction, so that the foldable plates turn easily with the conveyor.

10. The folding platform of claim 5 wherein the actuation means comprises arms extending from the rotably mounted foldable plates which cause folding in response to contact with a camming surface.

11. The folding platform of claim 5 wherein the actuation means comprises arms extending from the rotably mounted foldable plates which cause unfolding in response to contact with a camming surface.

12. The folding platform of claim 7 wherein the actuation means comprises members extending from the rotable mounting of the foldable plates spaced laterally to cause successive folding in response to contact with separate camming surfaces.

* * * * *